(12) United States Patent
Mo et al.

(10) Patent No.: US 10,712,523 B1
(45) Date of Patent: Jul. 14, 2020

(54) BRANCH FIBER OPTIC CABLE ASSEMBLY AND METHOD OF MAKING THE SAME

(71) Applicant: AMPHENOL CORPORATION, Wallingford, CT (US)

(72) Inventors: Xing-Fu Mo, Shenzhen (CN); Jun Wen, Shenzhen (CN); Ling-Hua Zhu, Shenzhen (CN); Anh Nguyen, Shenzhen (CN)

(73) Assignee: AMPHENOL CORPORATION, Wallingford, CT (US)

( * ) Notice: Subject to any disclaimer, the term of this patent is extended or adjusted under 35 U.S.C. 154(b) by 0 days.

(21) Appl. No.: 16/399,616

(22) Filed: Apr. 30, 2019

(30) Foreign Application Priority Data

Dec. 26, 2018 (TW) .............................. 107147070 A

(51) Int. Cl.
*G02B 6/44* (2006.01)
(52) U.S. Cl.
CPC ......... *G02B 6/4495* (2013.01); *G02B 6/4475* (2013.01)

(58) Field of Classification Search
CPC .... G02B 6/443; G02B 6/4401; G02B 6/4486; G02B 6/44
See application file for complete search history.

(56) References Cited

U.S. PATENT DOCUMENTS

| | | | |
|---|---|---|---|
| 2011/0097050 A1* | 4/2011 | Blackwell, Jr. ...... | G02B 6/4441 385/135 |
| 2018/0314021 A1* | 11/2018 | Courchaine ......... | G02B 6/4441 |

* cited by examiner

*Primary Examiner* — Jennifer Doan
(74) *Attorney, Agent, or Firm* — Muncy, Geissler, Olds & Lowe, P.C.

(57) ABSTRACT

A branch fiber optic cable assembly includes a main fiber optic cable and a plurality of stub cables. The main fiber optic cable has a plurality of branching sites which are spaced apart from each other along an axial direction of the main fiber optic cable. Each of the stub cables has a first end integrally connected to the main fiber optic cable at one of the branching sites, and a second end extending away from the main fiber optic cable. A method of making the branch fiber optic cable assembly is also disclosed.

10 Claims, 6 Drawing Sheets

BRANCH FIBER OPTIC CABLE ASSEMBLY AND METHOD OF MAKING THE SAME

CROSS-REFERENCE TO RELATED APPLICATION

This application claims priority to Taiwanese Patent Application No. 107147070, filed on Dec. 26, 2018.

FIELD

The disclosure relates to a fiber optic cable assembly and a method of making the same, and more particularly to a branch fiber optic cable assembly and a method of making the same.

BACKGROUND

A fiber optic cable is composed of a plurality of small core optical fibers adjacent to each other, and an outer jacket sleeved around the optical fibers. The fiber optic cable is capable of transmitting signals through the optical fibers. To connect the optical fibers to different connection points at different locations, the outer jacket is stripped so that the optical fibers can be branched for connection. Because the optical fibers are disposed within the jacket before being branched, it is unknown which of the optical fibers will be branched and how to manipulate the terminal ends thereof beforehand. Therefore, branched optical fibers have to be connected to other optical fibers by fusion-bonding in an optical fiber distribution box or optical fiber junction box. Not only is the operation for connecting the optical fibers difficult, but the cost is also increased. Still, there is a room for improvement.

SUMMARY

Therefore, one object of the disclosure is to provide a branch fiber optic cable assembly that can alleviate at least one of the drawbacks of the prior art.

According to one object of the disclosure, a branch fiber optic cable assembly includes a main fiber optic cable and a plurality of stub cables.

The main fiber optic cable extends along an axial direction, and has a plurality of branching sites which are spaced apart from each other along the axial direction.

Each of the stub cables has a first end integrally connected to the main fiber optic cable at one of the branching sites, and a second end extending away from the main fiber optic cable.

Another object of the disclosure is to provide a method of making a branch fiber optic cable assembly.

According another object of the disclosure, a method of making a branch fiber optic cable assembly includes:

(a) providing a main fiber optic cable extending along an axial direction, the main fiber optic cable including a plurality of inner cords juxtaposed to each other, and an outer jacket sleeved around the inner cords;

(b) providing the outer jacket with a plurality of branching sites which are spaced apart along the axial direction and each of which has a cut-out that angularly extends around and exposes the inner cords, the branching sites (B) dividing the outer jacket into a plurality of jacket portions, each of the branching sites being interposed between two of the jacket portions;

(c) cutting at least one of the inner cords exposed at a first one of the branching sites until the at least one of the inner cords has a cut end;

(d) pulling the at least one of the inner cords from a second one of the branching sites until the cut end of the at least one of the inner cords is released from the outer jacket and moved away from the second one of the branching sites, thereby causing a section of the at least one of the inner cords to branch from the main fiber optic cable; and (e) wrapping the section of the at least one of the inner cords with a protection sleeve, thereby forming at least one stub cable;

wherein steps (c) to (e) are repeated until a predetermined number of the inner cords are branched from the main fiber optic cable to form a plurality of the stub cables respectively at the branching sites.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
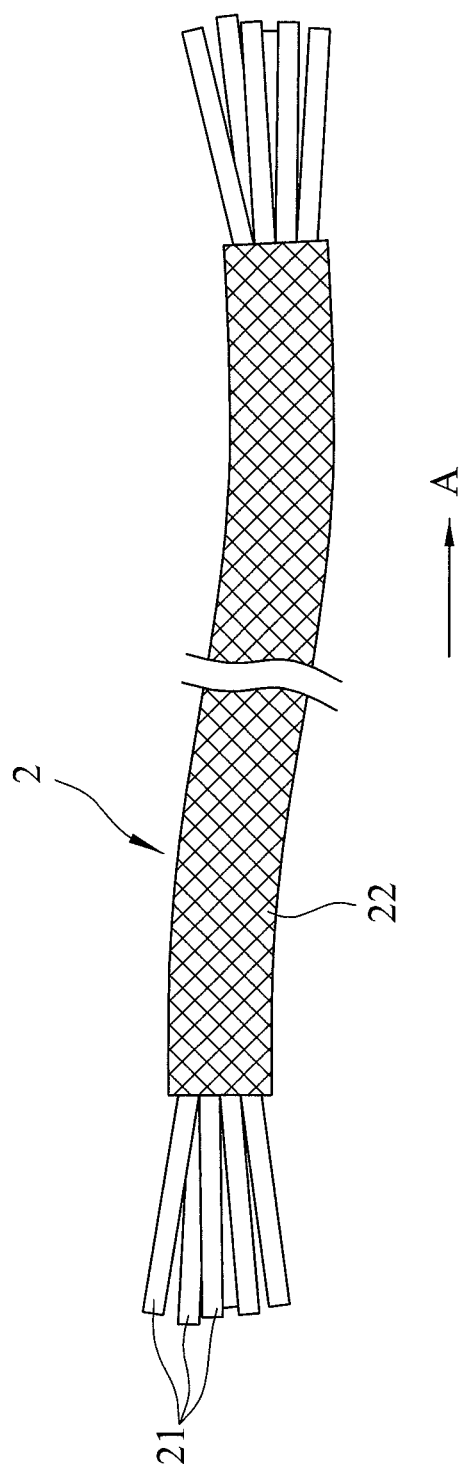
FIG. 1 illustrates a main fiber optic cable used in an embodiment according to the disclosure.

FIG. 1 illustrates a main fiber optic cable 2 used in an embodiment of a method of making a branch fiber optic cable assembly according to the disclosure. The method includes step (a) providing the main fiber optic cable 2 extending along an axial direction (A). The main fiber optic cable 2 includes a plurality of inner cords 21 juxtaposed to each other, and an outer jacket 22 sleeved around the inner cords 21.

Referring to FIGS. 2 to 5, the main fiber optic cable 2 is processed by the method of the disclosure. In particular, the method further includes step (B) in which the outer jacket 22 is provided with a plurality of branching sites (B) which are spaced apart along the axial direction (A) and each of which has a cut-out that is formed in the outer jacket 22 and that angularly extends around and exposes the inner cords 21. The cut-out is annular and exposes all of the inner cords 21. The branching sites (B) divide the outer jacket 22 into a plurality of jacket portions 220. Each of the branching sites (B) is interposed between two of the jacket portions 220.

Figure 2:
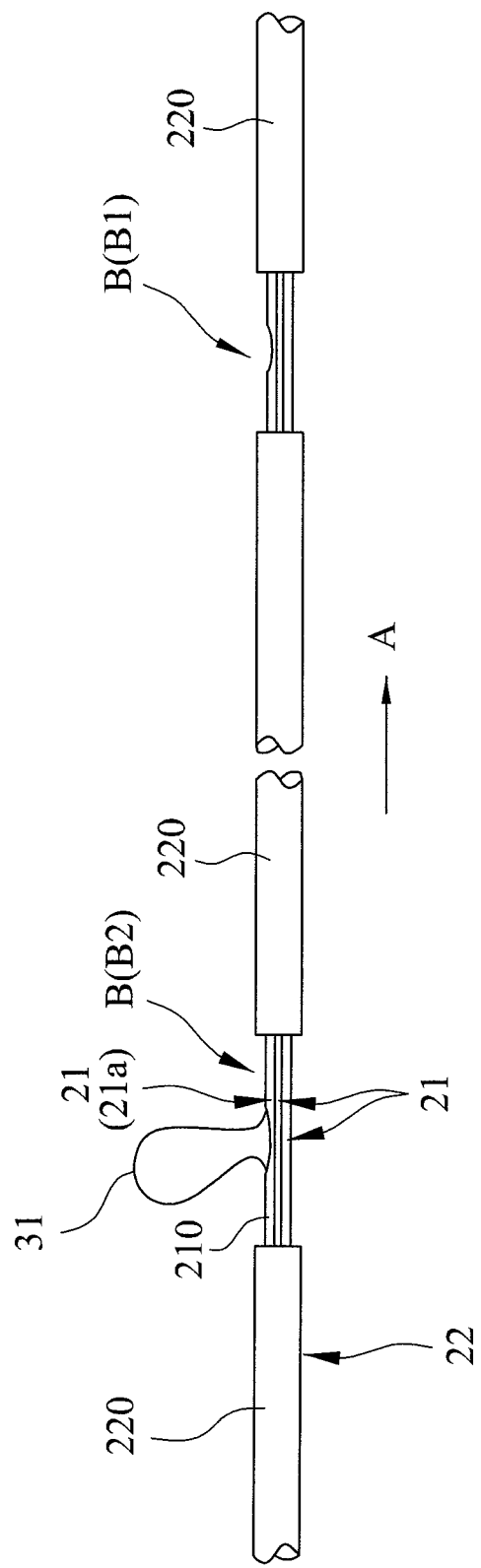
FIG. 2 is a side view illustrating that an outer jacket of the main fiber optic cable is provided with branching sites each having a cut-off and one of inner cords of the main fiber optic cable has a section pulled outward at one of the branching sites.

The method further includes the step (c) of cutting at least one of the inner cords 21 (see one of the inner cords 21 that is also designated as 21*a* in FIG. 2 for ease of explanation)

exposed at a first one of the branching sites (B) (referred to as the first branching site (B1) somewhere hereinafter) until the inner cord 21a has a cut end (not visible in FIG. 2). The cut end is shown at 31a in FIG. 3 and will be detailed hereinafter.

Figure 3:
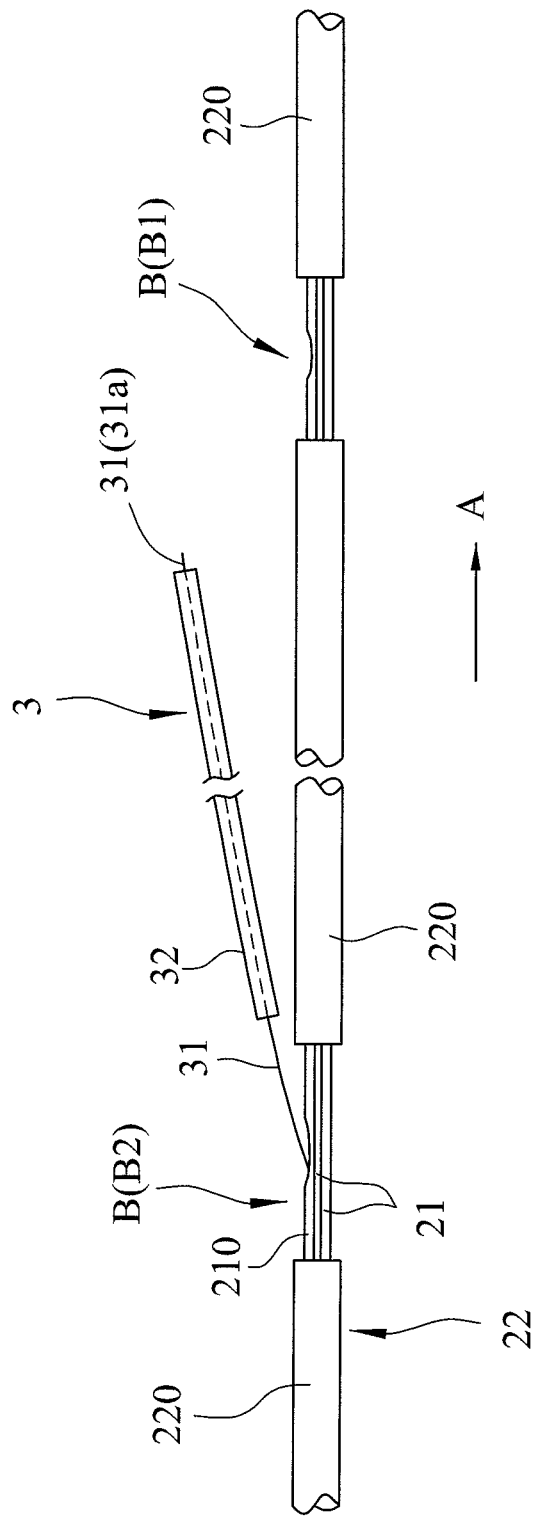
FIG. 3 is another side view of the embodiment illustrating a protection sleeve wrapping around the section of one of the inner cords for forming a stub cable.

The method further includes the step (d) of pulling the inner cord 21a from a second one of the branching sites (B) (referred to as the second branching site (B2) somewhere hereinafter). In FIG. 2, an optical fiber 31 of the inner cord 21a is pulled outward so that it forms a curve. In FIG. 3, the cut end 31a of the optical fiber 31 is at the outside of the outer jacket 22. The action of pulling is carried out until the cut end 31a of the inner cord 21a is released from the outer jacket 22 and moved away from the second branching site (B2), thereby causing a section of the inner cord 21a to branch from the main fiber optic cable 2.

Each inner cord 21 may be a sheathed or unsheathed fiber optic cord. In this embodiment, each inner cord 21 has a sheath 210 covering at least one optical fiber 31. In the cutting step (b), the inner cord 21a is partially stripped at the first branching site (B1) such that a part of the sheath 210 thereof is removed and the optical fiber 31 thereof is cut apart to have the cut end 31a. In the pulling step (c), a section of the optical fiber 31 is pulled outward from the sheath 210 at the second branching site (B2) until the cut end 31a of the optical fiber 31 is moved out from the outer jacket 22 and away from the second branching site (B2). Alternatively, each inner cord 21 may be a single unsheathed fiber cord according to other embodiments. The unsheathed fiber cord may be cut part at the first branching site (B1), and the resulting cut end thereof may be pulled out of the outer jacket 22 at the second branching site (B2).

While each inner cord 21 has one optical fiber 31 which is covered by the sheath 210 and a section of which is pulled out from the sheath 210 in this embodiment, each inner cord 21 may have a plurality of optical fibers 31 which are covered by the sheath 210 according to other embodiments. In addition, while only one inner cord 21 is cut at the first branching site (B1) to branch one optical fiber 31 at the second branching site (B2), more than one inner cords 21 may be cut at the first branching site (B1) to branch a plurality of the optical fibers 31 from the more than one inner cords 21 at the second branching site (B2). Moreover, while only one inner cord 21 is cut at the first branching site (B1), other inner cords 21 may be additionally cut at the first or second branching site (B1 or B2) and pulled outward at the second or first branching site (B2 or B1).

The method further includes the step (e) of wrapping the section of the inner cord 21a (i.e., a section of the optical fiber 31 of the inner cord 21a) which is pulled outward at the second branching site (B2) with a protection sleeve 32, thereby forming a stub cable 3. As shown in FIG. 3, the stub cable 3 includes a section of at least one optical fiber 31 of one of the inner cords 21, and the protection sleeve 32 sleeved around the section of the at least one optical fiber 31. The section of the optical fiber 31 is not entirely covered by the protection sleeve 32. According to other embodiments, the inner cord 21a may have multiple optical fibers 31 covered by the sheath 210, and the respective sections of the multiple optical fibers 31 will be pulled out at the second branching site (B2) and wrapped by one protection sleeve 32.

Figure 6:
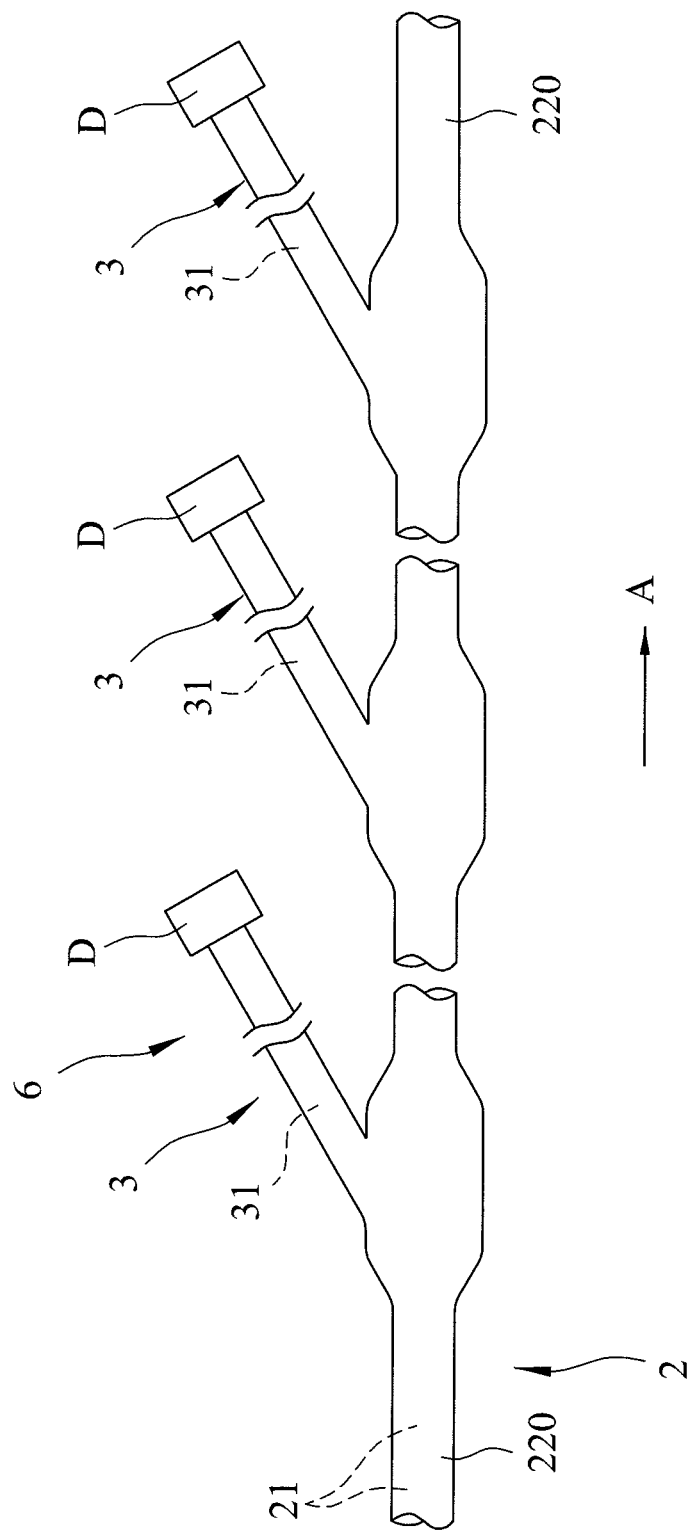
FIG. 6 illustrates a branch fiber optic cable assembly according to the disclosure.

Step (c) to step (e) are repeated until a predetermined number of the inner cords 21 are branched from the main fiber optic cable 2 to form a plurality of the stub cables 3 respectively at the branching sites (B) as shown in FIG. 6.

Figure 4:
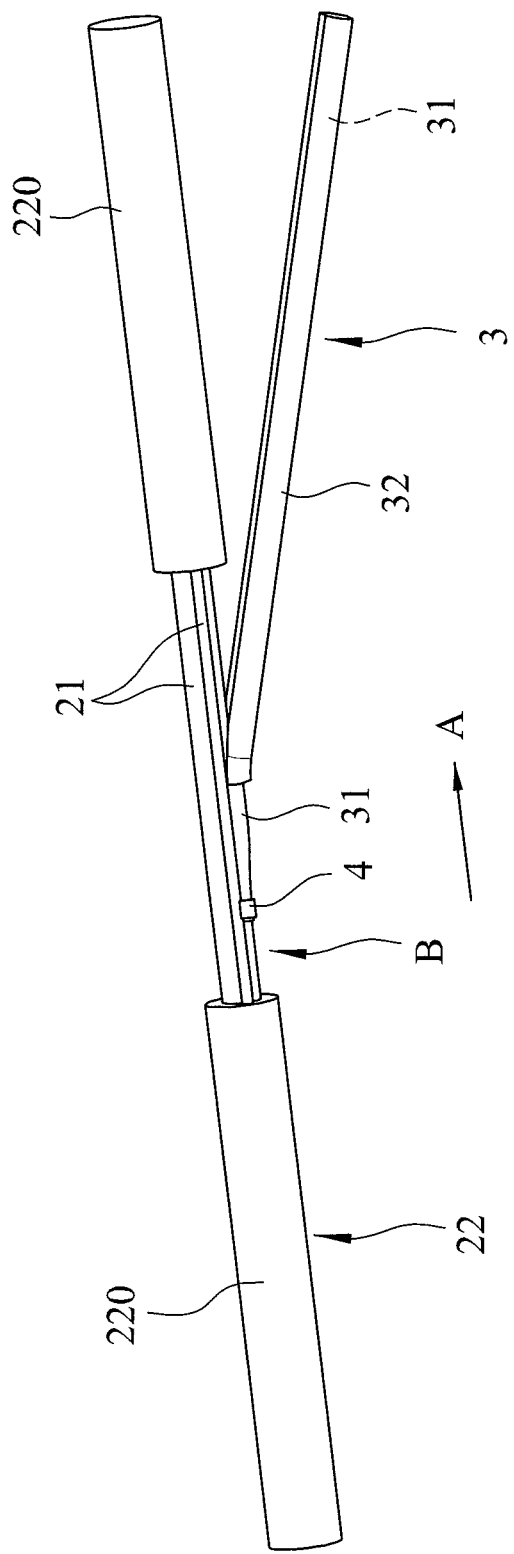
FIG. 4 is still another side view of the embodiment illustrating a fixing ring disposed around an optical fiber of the stub cable.

The method further includes the step of providing a plurality of fixing rings 4 (only one is shown in FIG. 4). The fixing rings 4 are respectively disposed within the cut-outs of the branching sites (B). As shown in FIG. 4, the fixing ring 4 is disposed in the second branching site (B2) around the optical fiber 31 at a point where the optical fiber 31 begins to branch from the main fiber optic cable 2. If the inner cord 21a has multiple optical fibers 31, one fixing ring 4 will be disposed around the multiple optical fibers 31. In this embodiment, the fixing ring 4 is a cold pressed metal ring which is fixed to the optical fiber 31 by using glue and Kevlar fabric. The fixing ring 4 may function as a node.

Figure 5:
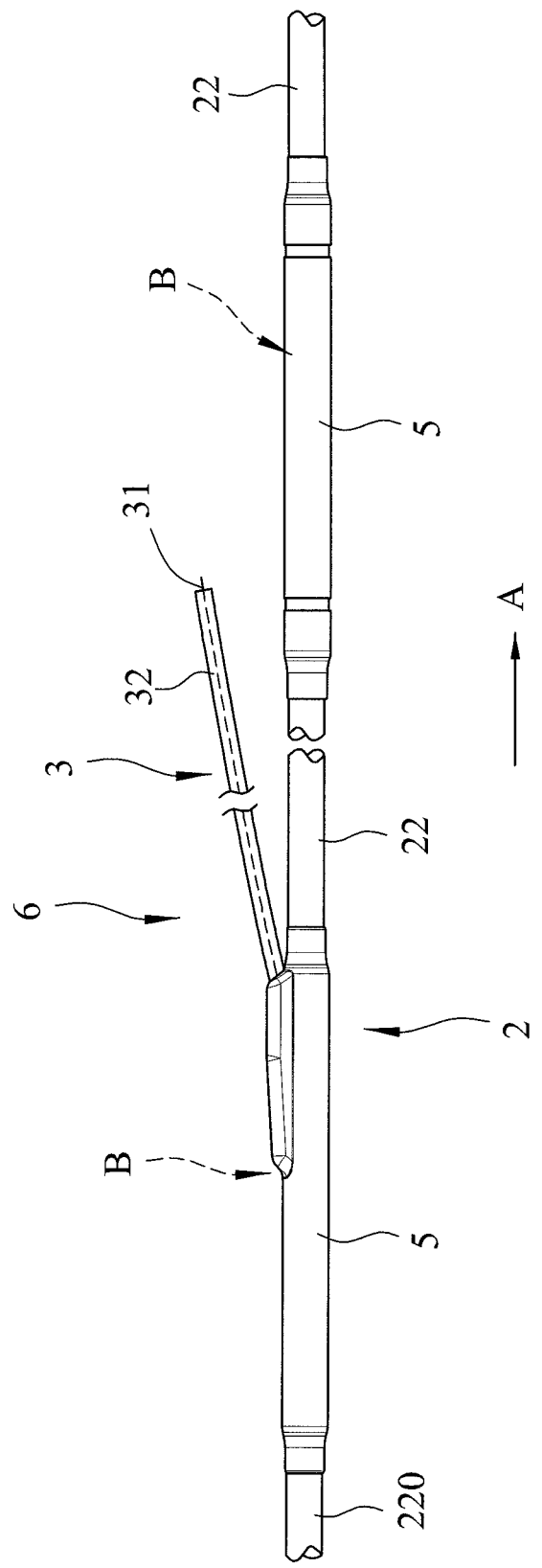
FIG. 5 is still another side view of the embodiment illustrating sealing sleeves each of which fills and covers one of the cut-outs of the branching sites.

The method further includes the step of providing a plurality of sealing sleeves 5. As shown in FIG. 5, each sealing sleeve 5 fills and covers one of the cut-outs of the branching sites (B) and one of the fixing rings 4, and has two opposites ends respectively connected to two adjacent ones of the jacket portions 220, there by sealing the inner cords 21 of the main finer optic cable 2. In particular, each sealing sleeve 5 is a molded body formed by an over-molding method or a potting method around the main fiber optic cable 2. The sealing sleeves 5 firmly connect the main fiber optic cable 2 and the stub cables 3. The way of forming the sealing sleeves 5 should not be limited to this embodiment. Through the aforesaid steps, the branch fiber optic cable assembly 6 (see FIG. 6) of the disclosure is produced.

Referring to FIG. 6, the branch fiber optic cable assembly 6 has the main fiber optic cable 2 extending along the axial direction (A), and the stub cables 3 integrally connected to the main fiber optic cable 2. The number of the stub cables 3 corresponds to a predetermined number. Each stub cable 3 has a first end integrally connected to the main fiber optic cable 2, and a second end extending away from the main fiber optic cable 2. Because the branch fiber optic cable assembly 6 has the stub cables 3 which are preformed at a production factory, it is not necessary to strip the outer jacket 22 and to conduct fusion-bonding for connection of the branch fiber optic cable assembly 6 with optical fibers of external equipment, thereby saving installation times and enhancing reliability. In addition, the second end of each stub cable 3 may be directly connected to an outdoor fiber optic connector (D) (see FIG. 6), or the branch fiber optic cable assembly 6 per se may be formed into a fiber optic pigtail. No extra accessories are required during field installation. Therefore, the branch fiber optic cable assembly 6 can reduce costs and installation difficulties and allow flexibility in use.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A branch fiber optic cable assembly, comprising:
   a main fiber optic cable extending along an axial direction, and having a plurality of branching sites which are spaced apart from each other along the axial direction; and
   a plurality of stub cables, each of said stub cables having a first end integrally connected to said main fiber optic cable at one of said branching sites, and a second end extending away from said main fiber optic cable,
   wherein said main fiber optic cable includes a plurality of inner cords juxtaposed to each other, and an outer jacket sleeved around said inner cords, each of said inner cords having at least one optical fiber, said branching sites respectively having cut-outs each of which is formed in said outer jacket to extend around and expose said inner cords and which divides said outer jacket into a plurality of jacket portions, each of said branching sites being disposed between two adjacent ones of said jacket portions, each of said stub cables including a section of said at least one optical fiber of at least one of said inner cords, and a protection sleeve sleeved around said section of said at least one optical fiber.

2. The branch fiber optic cable assembly as claimed in claim 1, further comprising a plurality of fixing rings each disposed within one of said cut-outs of said branching sites and fixed to said at least one optical fiber at a location where said at least one optical fiber starts to branch from said main fiber optic cable.

3. The branch fiber optic cable assembly as claimed in claim 2, further comprising a plurality of sealing sleeves, each of which fills and covers one of said cut-outs of said branching sites.

4. The branch fiber optic cable assembly as claimed in claim 3, each of said sealing sleeves is a molded body formed by an over-molding method, or a potting method, and has two opposite ends respectively connected to two adjacent ones of said jacket portions.

5. A method of making a branch fiber optic cable assembly, comprising:
   (a) providing a main fiber optic cable extending along an axial direction, the main fiber optic cable (2) including a plurality of inner cords juxtaposed to each other, and an outer jacket sleeved around the inner cords;
   (b) providing the outer jacket with a plurality of branching sites which are spaced apart along the axial direction and each of which has a cut-out that angularly extends around and exposes the inner cords, the branching sites dividing the outer jacket into a plurality of jacket portions, each of the branching sites being interposed between two of the jacket portions;
   (c) cutting at least one of the inner cords exposed at a first one of the branching sites until the at least one of the inner cords has a cut end;
   (d) pulling the at least one of the inner cords from a second one of the branching sites until the cut end of the at least one of the inner cords is released from the outer jacket and moved away from the second one of the branching sites, thereby causing a section of the at least one of the inner cords to branch from the main fiber optic cable; and
   (e) wrapping the section of the at least one of the inner cords with a protection sleeve, thereby forming at least one stub cable;
   wherein steps (c) to (e) are repeated until a predetermined number of the inner cords are branched from the main fiber optic cable to form a plurality of the stub cables respectively at the branching sites.

6. The method as claimed in claim 5, further comprising disposing a fixing ring in the second one of the branching sites, the fixing ring being disposed around the section of the at least one inner cords at a point where the at least one inner cords begins to branch from the main fiber optic cable.

7. The method as claimed in claim 6, wherein the fixing ring is fixed to the at least one optical fiber by using glue and Kevlar fabric.

8. The method as claimed in claim 7, further comprising providing a plurality of sealing sleeves after the fixing ring is disposed, each of the sealing sleeves fills and covers one of the cut-outs of the branching sites and has two opposites ends respectively connected to two adjacent ones of the jacket portions.

9. The method as claimed in claim 8, wherein each of the sealing sleeves is a molded body formed by an over-molding method or a potting method.

10. The method as claimed in claim 5, wherein each of the inner cords has at least one optical fiber covered by a sheath, and wherein the pulling of the at least one of the inner cords from a second one of the branching sites in step includes the step of partially stripping the at least one of the inner cords in the second one of the branching sites and pulling outward a section of the at least one optical fiber of the at least one of the inner cords from the sheath thereof for forming the at least one stub cable.

\* \* \* \* \*